(12) United States Patent
Sato

(10) Patent No.: US 11,740,843 B2
(45) Date of Patent: Aug. 29, 2023

(54) PRINTING CONTROL METHOD, INFORMATION PROCESSING APPARATUS AND STORAGE MEDIA

(71) Applicant: CANON KABUSHIKI KAISHA, Tokyo (JP)

(72) Inventor: Hiromu Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/873,429

(22) Filed: Jul. 26, 2022

(65) Prior Publication Data

US 2022/0357902 A1    Nov. 10, 2022

Related U.S. Application Data

(63) Continuation of application No. PCT/JP2021/003029, filed on Jan. 28, 2021.

(30) Foreign Application Priority Data

Jan. 31, 2020   (JP) ................................. 2020-014859

(51) Int. Cl.
  *G06F 3/12*     (2006.01)
(52) U.S. Cl.
  CPC ............ *G06F 3/1234* (2013.01); *G06F 3/121* (2013.01); *G06F 3/1294* (2013.01)
(58) Field of Classification Search
  CPC ...... G06F 3/1234; G06F 3/121; G06F 3/1294; G06F 3/12; B41J 29/38
  See application file for complete search history.

(56) References Cited

U.S. PATENT DOCUMENTS 9,894,243 B2    2/2018 Kadota
10,126,990 B2 *  11/2018 Honda .................. G06F 3/1285
(Continued)

FOREIGN PATENT DOCUMENTS

JP    2003-131857 A    5/2003
JP    2012-185742 A    9/2012
(Continued)

OTHER PUBLICATIONS

PCT International Search Report dated Apr. 13, 2021, in related PCT Application No. PCT/JP2021/003029.

*Primary Examiner* — John R Wallace
(74) *Attorney, Agent, or Firm* — Venable LLP

(57) ABSTRACT

A print control method uses print control software to communicate with OS printing software operating in an information processing apparatus capable of communicating with a printer. The method includes identifying, by the print control software, an error occurring in the printer based on status information obtained from the printer, and performing control such that in a case where the OS printing software is not capable of displaying the identified error, the print control software notifies the OS printing software of an identifier indicating a generic error such that the generic error is displayed in an area for displaying a state of the printer in the display screen, and the print control software notifies the OS printing software of a message corresponding to the identified error such that the message corresponding to the identified error is displayed in an area for displaying a state of a job in a display screen.

11 Claims, 12 Drawing Sheets

(56) References Cited

U.S. PATENT DOCUMENTS

| | | | |
|---|---|---|---|
| 10,437,538 B2 | 10/2019 | Kanamori | |
| 2005/0071495 A1* | 3/2005 | Kadota | G03G 15/55 709/232 |
| 2007/0245039 A1* | 10/2007 | Dahneke | G06F 9/4411 710/15 |
| 2016/0179450 A1* | 6/2016 | Shirai | G06F 9/46 358/1.15 |
| 2017/0094107 A1 | 3/2017 | Kadota | |
| 2018/0067704 A1* | 3/2018 | Kobayashi | G06F 3/1285 |
| 2019/0107984 A1 | 4/2019 | Kanamori | |

FOREIGN PATENT DOCUMENTS

| | | |
|---|---|---|
| JP | 2017-068659 A | 4/2017 |
| JP | 2019-070926 A | 5/2019 |

* cited by examiner

| ERROR | IPP printer-state-reasons Key | CORRESPONDING OS ERROR MESSAGE |
|---|---|---|
| NO PAPER | media-empty | PLEASE SET PAPER. |
| PAPER JAM | media-jam | PAPER JAM. |
| INK LOW | marker-supply-low | PRINTER'S INK IS RUNNING LOW. |
| INK EMPTY | marker-supply-empty | PRINTER'S INK MAY HAVE RUN OUT. |
| OTHER | other | PLEASE CHECK PRINTER FOR ERROR. |

FIG.4A

| ERROR | IPP printer-state-reasons Key | CORRESPONDING OS ERROR MESSAGE |
|---|---|---|
| NO PAPER | media-empty | PLEASE SET PAPER. |
| PAPER JAM | media-jam | PAPER JAM. |
| INK LOW | marker-supply-low | PRINTER'S INK IS RUNNING LOW. |
| INK EMPTY | marker-supply-empty | PRINTER'S INK MAY HAVE RUN OUT. |
| WASTE INK FULL | marker-waste-full | PRINTER'S WASTE TRAY IS FULL. |
| COVER OPEN | cover-open | PRINTER'S DOOR IS OPEN. |
| OTHER | other | PLEASE CHECK PRINTER FOR ERROR. |

FIG.4B

| ERROR | ERROR NUMBER (DEFINED BY VENDOR) | IPP printer-state-reasons Key | ERROR MESSAGE DEFINED INDEPENDENTLY BY VENDOR |
|---|---|---|---|
| NO PAPER | 1000 | media-empty | PAPER HAS RUN OUT. PLEASE SET PAPER. |
| PAPER JAM | 1300 | media-jam | PAPER IS JAMMED. PLEASE PULL OUT PAPER SLOWLY. |
| INK LOW | 1500 | marker-supply-low | PRINTER'S INK IS RUNNING LOW. |
| INK EMPTY | 1688 | marker-supply-empty | PRINTER'S INK MAY HAVE RUN OUT. PLEASE EXCHANGE INK. |
| WASTE INK FULL | 5800 | marker-waste-full | PRINTER'S WASTE TRAY IS FULL. INK LEAK MAY OCCUR. |
| COVER OPEN | 1270 | cover-open | PRINTER'S COVER IS OPEN. PLEASE CLOSE COVER. |
| NO CASSETTE | 1871 | other | CASSETTE IS NOT INSTALLED CORRECTLY. |

FIG.5

PRINTING CONTROL METHOD, INFORMATION PROCESSING APPARATUS AND STORAGE MEDIA

CROSS-REFERENCE TO RELATED APPLICATIONS

This application is a Continuation of International Patent Application No. PCT/JP2021/003029, filed Jan. 28, 2021, which claims the benefit of Japanese Patent Application No. 2020-014859, filed Jan. 31, 2020, all of which are hereby incorporated by reference herein in their entirety.

BACKGROUND OF THE INVENTION

Field of the Invention

This disclosure relates to an information processing apparatus and programs.

Description of the Related Art

In a system in which a printer and a personal computer (hereinafter referred to as "PC") are connected, a technology is known to inform the user in a case where an error is occurring in the printer by displaying the error state on the PC screen (Japanese Patent Laid-Open No. 2003-131857).

Some operating systems (hereinafter referred to as "OS") installed in PCs have a function to display standard OS error messages (hereinafter referred to as "standard error notification function"). These operating systems have predefined several standard types of errors that occur during printing. In a case where the printer driver notifies the OS of an error based on status information on a printer, the OS notifies the user of the error by displaying a dialog or icon through the standard error notification function.

Depending on the OS version, the standard errors defined may differ. For example, if an error newly defined in a newer version of the OS is notified to an older version of the OS, that older version of the OS will not recognize the error correctly and will not be able to properly inform the user of the error.

SUMMARY OF THE INVENTION

A printing control method operable in an information processing apparatus capable of communicating with a printer in accordance with an aspect of the present disclosure includes a determination step of determining an error occurring in the printer based on status information obtained from the printer; and a control step of controlling information to be notified to OS printing software operating in the information processing apparatus according to whether the OS printing software is capable of notifying the error determined in the determination step.

Further features of the present invention will become apparent from the following description of exemplary embodiments with reference to the attached drawings.

BRIEF DESCRIPTION OF THE DRAWINGS

FIGS. 4A and 4B show an example of a table of standard errors defined by the OS, respectively;

FIG. 5 shows an example of a table of individual errors maintained by the printer driver;

DESCRIPTION OF THE EMBODIMENTS

The following is a detailed description of a suitable embodiment of the invention with reference to the accompanying drawings. Note that the following embodiments are not intended to limit the invention as claimed, and not all of the combinations of features described in the embodiments are essential to the solution of the invention.

First Embodiment

<System Hardware Configuration>

Figure 1:
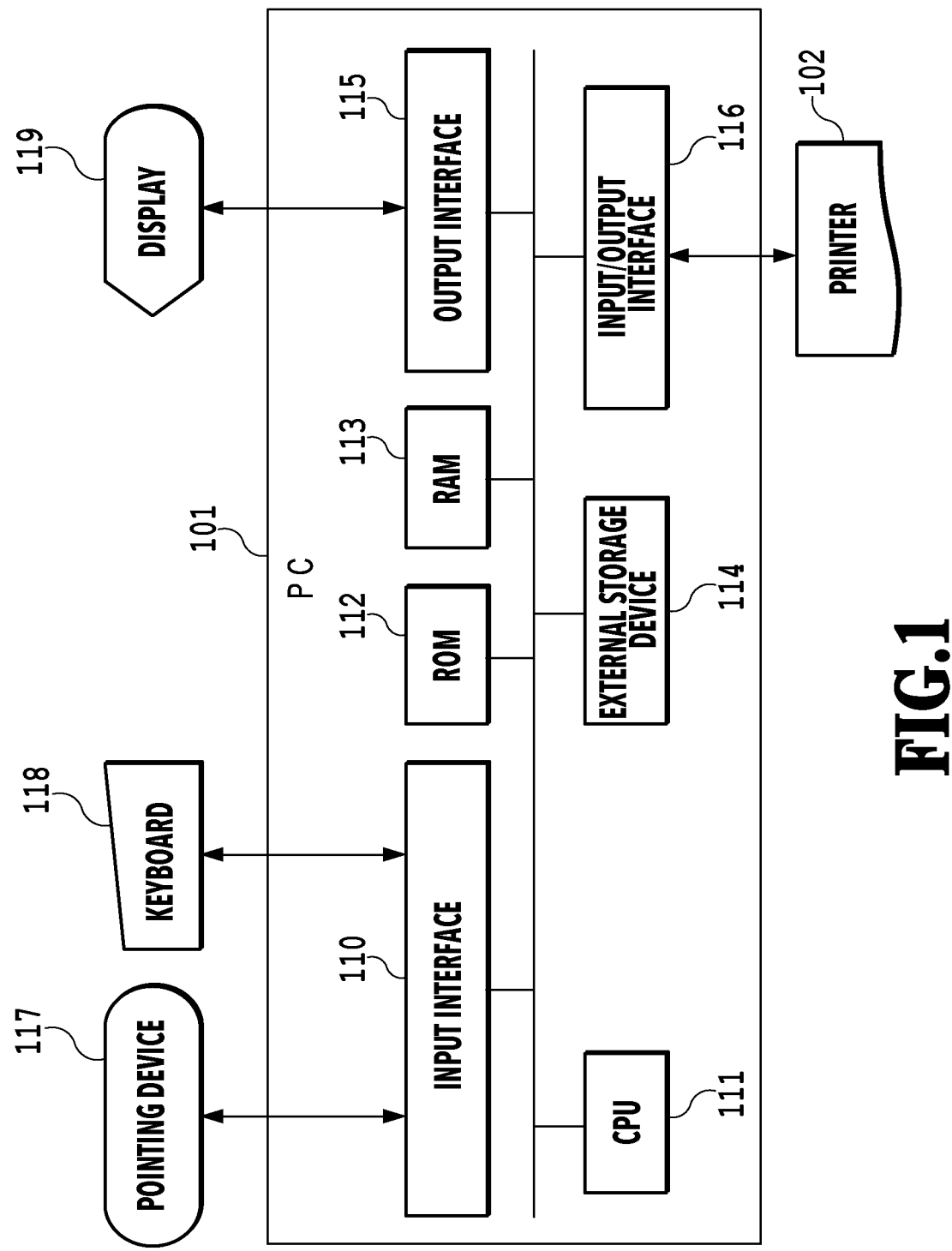
FIG. 1 is a block diagram showing the hardware configuration of the system.

FIG. 1 is a block diagram showing the hardware configuration of the system used for printing in the present embodiment. This system has a PC 101 which is a host computer, and a printer, 102. PC 101 is an example of an information processor and has an input interface 110, CPU 111, ROM 112, RAM 113, external storage device 114, output interface 115, and input/output interface 116. An input device such as a keyboard 118 or pointing device 117 is connected to the input interface 110, and a display device such as a display 119 is connected to the output interface 115.

ROM 112 contains the initialization program. The external storage device 114 contains a group of application programs, an operating system (OS), a specific printer driver, and various other data. RAM 113 is used as work memory, etc., for the execution of various programs stored in external storage device 114.

In the present embodiment, the CPU 111 performs processing according to the procedures of the program stored in ROM 112 to realize the functions described below in PC 101 and the processing pertaining to the flowchart described below. The printer 102 is a device is connected to PC 101 via input/output interface 116. Here, PC 101 and printer 102 are configured separately, but they may be configured as a single information processing apparatus.

<Block Configuration>

Figure 2:
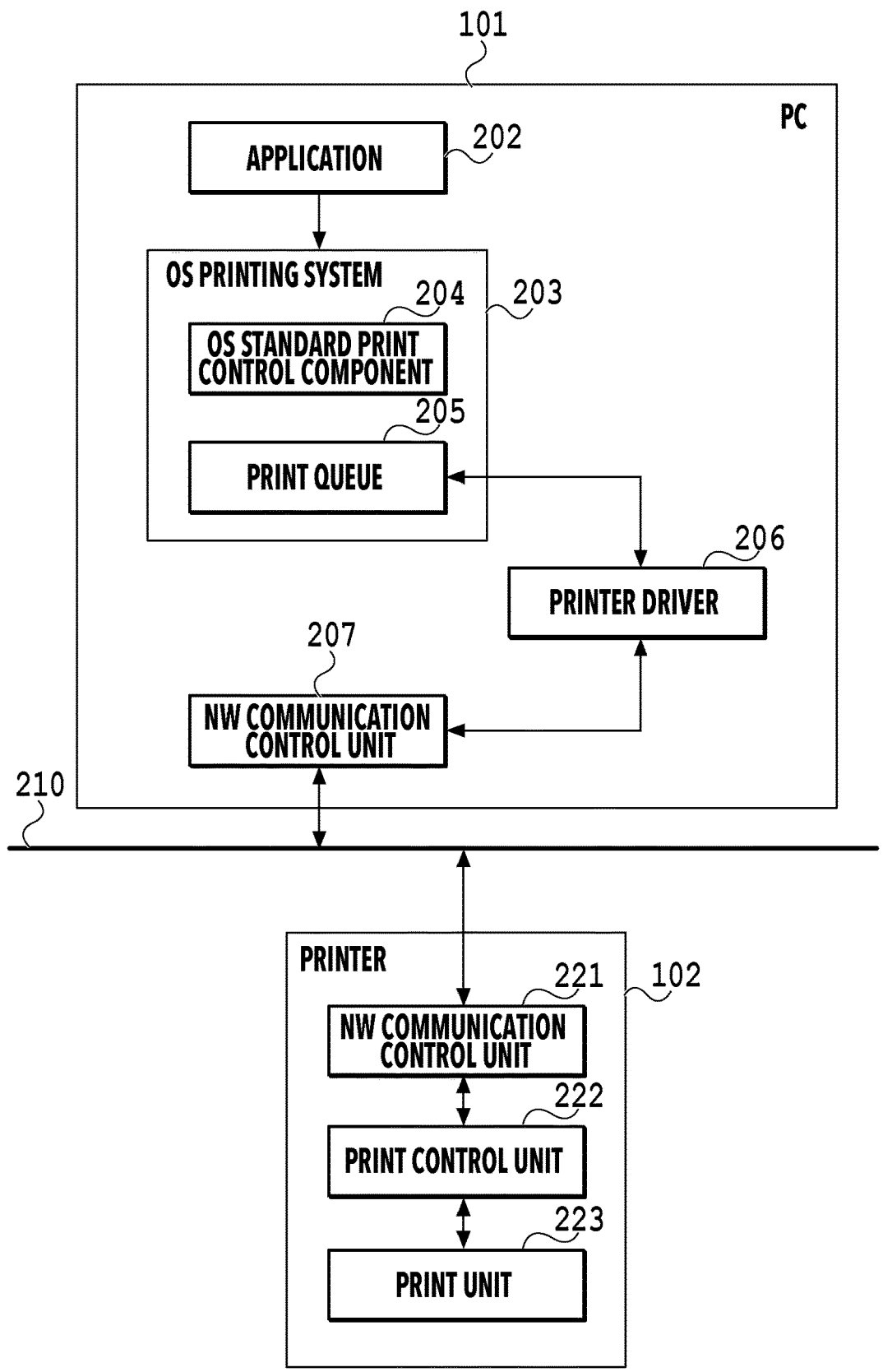
FIG. 2 shows a block diagram of the system.

FIG. 2 is a block diagram showing the configuration of this system. PC101 and printer 102 are connected via a network 210 and can communicate with each other. The present embodiment assumes a Local Area Network (LAN) as the network, but it may be a Wide Area Network (WAN). The network may be wired or wireless, or a mixture thereof. The PC101 controls the printer 102, which is connected via network 210. In the present embodiment, the OS printing system 203 is assumed to operate based on the specifications of the Internet Printing Protocol (hereinafter referred to as IPP) which is a standard printing protocol.

Although not explicitly shown in FIG. 2, an OS is implemented in the PC 101, and the resources of the PC 101, for example, each block in the PC 101, are managed and can be operated by the OS. In the present embodiment, macOS (registered trademark) is assumed as the OS implemented in the PC 101.

The PC 101 includes an application 202, an OS printing system 203, a vendor-provided printer driver 206, and a network (NW) communication control unit 207. The OS printing system 203 includes an OS standard print control component 204 and a print queue 205. The printer driver 206, which is the print control software of the present embodiment, is compatible with (supports) the IPP used by the OS standard print control component 204.

Various processes in the OS printing system 203 are performed by the control of the OS standard print control component 204 in the OS printing system 203, which is the OS print software. The print queue 205 is an object for executing printing from the OS or the application 202. Each print queue has a name, presence/absence of sharing, settings for the port or server to connect to, print settings, device-related settings, and the like. The print queue 205 is also used as an object for storing print data.

Further, the OS printing system 203 has a portion for storing two pieces of information, that is, the state of the printer and the state of the job. The printer driver 206 can store and update such information in the OS printing system 203 via IPP. The part where the printer state is stored is called "printer-state-reasons". The part where the job state is stored is called "job-printer-state-message". In a case where the OS printing system 203 uses the standard error notification function to notify errors, the OS printing system 203 displays the dialog shown in FIG. 3 (print queue screen 30) and notifies the user of the error based on the information stored in these parts and at tables shown in FIGS. 4A and 4B, which is described below. Details of this process are described below.

The application 202 is software that generates drawing data based on a user instruction. The application referred to here is software that can operate on the OS. Examples of the application 201 include word processing software for creating documents, image editing software, and New Year's card creation software. The drawing data generated by the drawing application is, for example, PDF (Portable Document Format) format data. In a case where the user requests printing of the data created by the application 202, the request is submitted to the OS printing system 203 as a print job. The OS printing system 203 manages the print jobs received from the application 202 by including them in the print queue 205, and sequentially sends them to the printer driver 206 for processing. The printer driver 206 converts the print data into print data that can be interpreted by the printer 102, and transmits the print data to the printer 102 via the NW communication control unit 207.

While the print process is being executed, the printer driver 206 periodically requests the printer 102 to obtain status information via the NW communication control unit 207. The status information includes information on the printer state the job state described above. The printer driver 206 analyzes the printer state and the job state included in the status information obtained as a response from the printer 102. As a result of the analysis, if it is determined that an error has occurred, the printer driver 206 notifies the OS printing system 203 of the error. The status information that the printer 102 responds to in response to the request from the printer driver 206 is the status information according to the vendor-specific protocol. The printer driver 206 analyses the vendor-specific protocols and stores the printer state in "printer-state-reasons" as IPP information. The printer driver 206 also stores the job state in "job-printer-state-message".

Printer 102 has NW communication control unit 221, print control unit 222, and print unit 223. The print control unit 222 receives print data from the PC101 via the NW communication control unit 221 and controls the print unit 223 to execute printing based on the print data.

Figure 3:
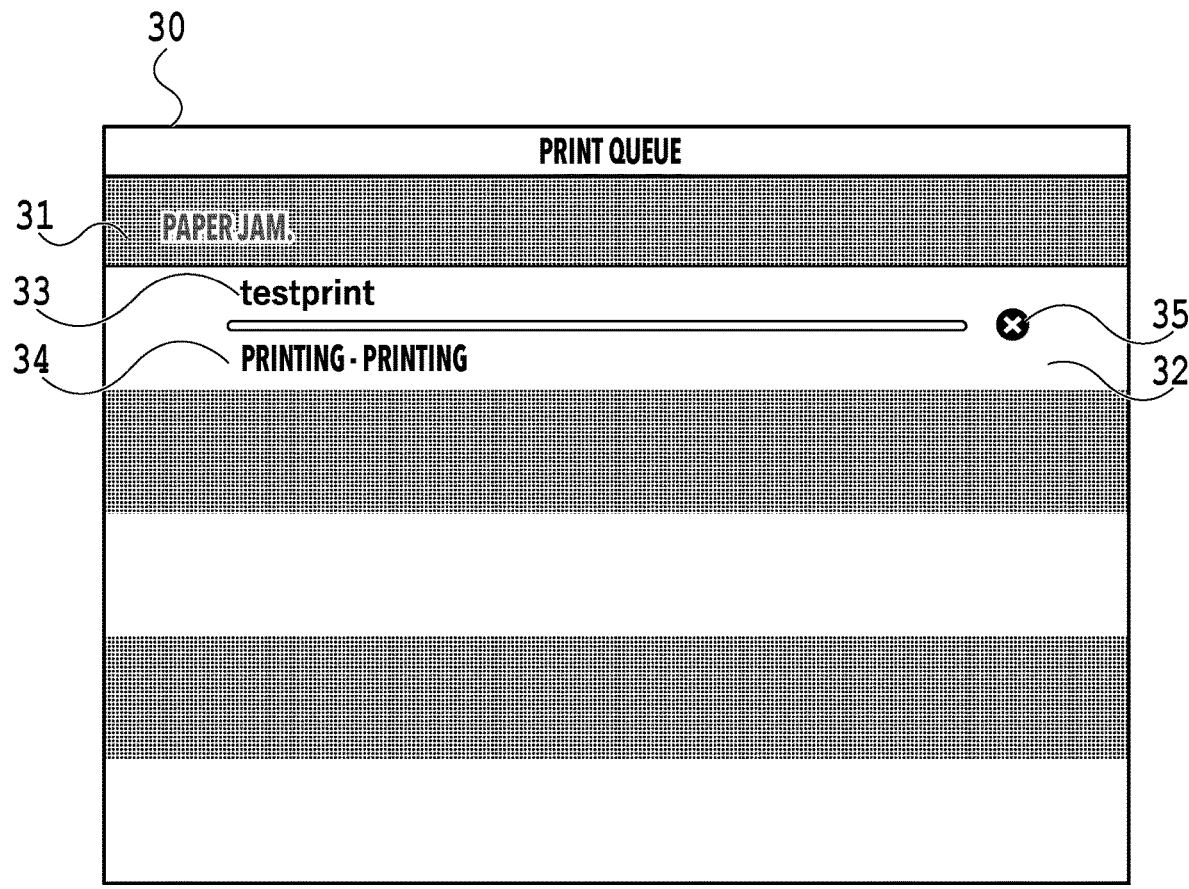
FIG. 3 shows the print queue screen displayed by the OS printing system.

FIG. 3 shows the print queue screen 30 displayed by the OS printing system 203. The OS printing system 203 can display a print queue screen 30 for users to check print jobs stored in the print queue 205. The PC 101 displays the print queue screen 30 on the display 119 in response to user operation. The print queue screen 30 includes a printer status display area 31 and a print job display area 32.

FIGS. 4A and 4B show an OS error message correspondence table 40, which is an example of a table of standard errors defined by the OS, respectively. FIGS. 4A and 4B show the OS error message correspondence table 40 for different versions of the OS. In a case where a printer error occurs, the printer driver 206 stores information of the printer state in "printer-state-reasons" via the OS printing system 203. The print queue screen 30 displayed by the OS printing system 203 will then display the corresponding error message in the printer status display area 31 in FIG. 3 according to the OS error message correspondence table 40. The example in FIG. 3 shows an example where the printer driver 206 stores media-jam information in "printer-state-reasons". In the printer status display area 31 of the print queue screen 30, the message "Paper jam" is displayed according to the OS error message correspondence table 40. The user can check the message in the printer status display area 31 to know whether or not the printer 102 is in an error state.

There are two types of standard errors defined in the OS: those for which individual keys are defined for each error, as shown in the OS error message correspondence table 40, and those for generic errors, which can be handled universally as "other." A Key with individually defined errors is referred to as an individual error Key, and a Key with generic errors is referred to as a generic error Key. In addition, this OS error message correspondence table 40 varies depending on the OS version. For example, the waste ink full error and cover open error, which were not present and not supported by the OS in the first version of the OS corresponding to FIG. 4A, are present and supported by the OS in the second version of the OS corresponding to FIG. 4B.

Here, it is assumed that the printer driver 206 stores the cover open error in the "printer-state-reasons" of the OS printing system 203 in correspondence with the second version of the OS corresponding to FIG. 4B. At this time, in a case where the PC 101 operates on the first version of the OS corresponding to FIG. 4A, the OS printing system 203 of the first version of the OS cannot identify an individual error such as the cover open error. Therefore, in the OS printing system 203 of the first version of the OS, a state in which appropriate error notification is not performed may occur. Therefore, in the OS printing system 203 of the first version of the OS, a state in which appropriate error notification is not performed may occur. In the present embodiment, the occurrence of such a state is suppressed.

The description of the print queue screen 30 of FIG. 3 will be continued. The print job display area 32 includes a print job name display area 33 and a print job status display area 34. If the printer driver 206 stores the job status information in the "job-printer-state-message" via the OS printing system 203, the status information related to the print job is displayed in the print job status display area 34. The user can know the status related to the print job in the print job display area 32.

Further, the user can press the print stop button 35 to instruct the printer 102 to stop the print process and delete the print job.

FIG. 5 is a diagram showing an example of an error table 50 corresponding to an individual error held by the printer driver 206. If the print control unit 222 detects that an error has occurred, the printer 102 returns an error to the printer driver 206 via the NW communication control unit 207 and the NW communication control unit 221. The printer driver 206 analyzes the received error and determines the error number. The printer driver 206 determines the IPP printer-state-reasons Key suitable for the error corresponding to the determined error number according to the error table 50 managed independently by the vendor.

Figure 6:
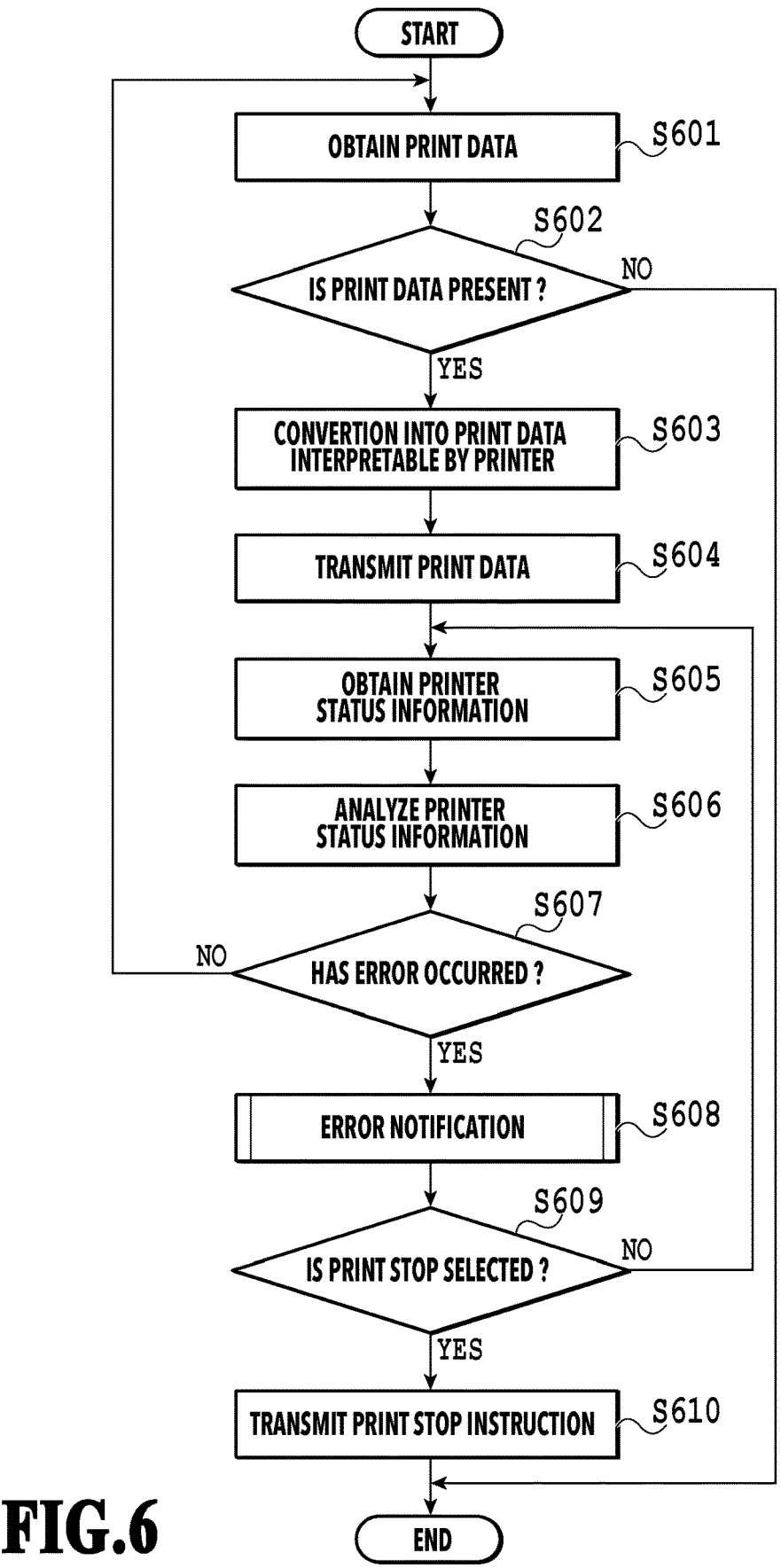
FIG. 6 shows the flow of the printer driver's print data transmission process.

FIG. 6 is a diagram showing a flow of print data transmission processing of the printer driver 206. The process shown in FIG. 6 is performed by the CPU 111 executing the program of the printer driver 206 stored in the ROM 112 or the external storage device 114. A sign "S" in the description of each processing means a step in the flow chart (it is similar in the present specification).

In S601, the printer driver 206 attempts to obtain print data. In a case where the OS printing system 203 sends the print data to the printer driver 206, the printer driver 206 obtains the print data in S601. In S602, the printer driver 206 determines the presence/absence of the obtained print data, proceeds to S603 in a case where the print data is present, and ends the process if the print data is absent.

In S603, the printer driver 206 converts the print data (print data sent by IPP) obtained from the OS printing system 203 into print data that can be interpreted by the printer 102. In S604, the printer driver 206 transmits the converted print data to the printer 102.

In S605, the printer driver 206 obtains the status information sent from the printer 102 by the vendor-specific protocol. In S606, the printer driver 206 analyzes the status information. In S607, the printer driver 206 determines whether or not an error has occurred based on the analyzed status information. If it is determined that no error has occurred, the process returns to S601 and repeats the process of obtaining print data from the OS printing system 203 and repeat the obtainment of print data from the OS printing system, as well as the conversion to vendor-specific format and transmission. If it is determined that an error has occurred, the process proceeds to S608.

In S608, printer driver 206 performs error notification processing. For example, the printer driver 206 notifies the OS printing system 203 of the "IPP printer-state-reasons Key" which is appropriate for the error type. The OS printing system 203 will then notify (display) an error message on the print queue screen 30, as shown in FIG. 3. The details of S608 are described below.

In S609, the printer driver 206 determines whether the print stop button 35 on the print queue screen 30 is pressed and print stop is selected. If print stop is selected, the process proceeds to S610 and the printer driver 206 instructs the printer 102 to stop the printing process and exit. If print stop is not selected, the process returns to S605 and repeats the process.

Figure 7:
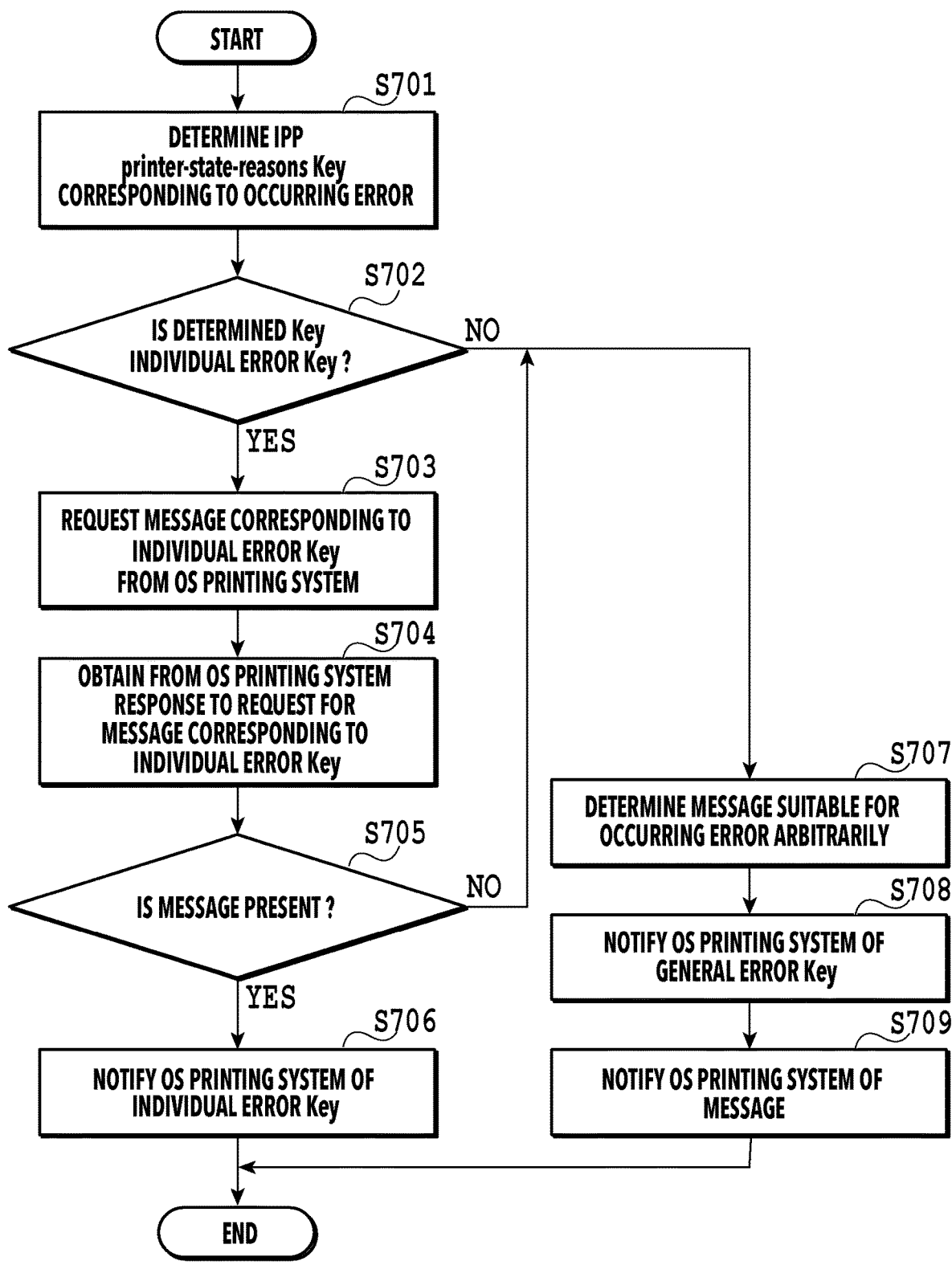
FIG. 7 shows the flow of the printer driver's error notification process.

FIG. 7 shows the detailed flow of the error notification process of the printer driver 206 in S608 of FIG. 6. In S701, the printer driver 206 determines the error from the status information of the printer 102 analyzed in S606 and determines the "IPP printer-state-reasons Key" that should be notified to the OS printing system 203. The process of S701 is performed with reference to the error table 50 corresponding to the individual errors shown in FIG. 5. The "IPP printer-state-reasons Key" is an identifier that identifies the printer state (error state) to be notified by the standard error notification function of the OS printing system 203. In S702, the printer driver 206 determines whether the "IPP printer-state-reasons Key" determined in S701 is an individual error Key. To determine whether it is an individual error Key, information on whether it is a generic error Key or an individual error Key may be added to the error table 50 corresponding to individual errors shown in FIG. 5, for example. Alternatively, a given Key may be determined to be a generic error Key and other Keys may be determined to be individual error Keys. In this example, if the determined "IPP printer-state-reasons Key" is Other, it is determined to be a generic error; otherwise, it is determined to be an individual error Key. If it is determined that the key is an individual error key, the process proceeds to S703, and if it is not an individual error key, the process proceeds to S707.

In S703, the printer driver 206 requests OS-defined error messages corresponding to the individual error Keys from the OS printing system 203. In the present embodiment, the printer driver 206 can obtain the error message corresponding to the "printer-state-reasons" via the OS printing system 203. In a case where the printer driver 206 requests a message by specifying "printer-state-reasons", the OS printing system 203 responds with the corresponding message. The OS printing system 203 does not respond if the corresponding message does not exist. The printer driver 206 can determine whether the OS printing system 203 supports individual error Keys by its response to a request to the OS printing system 203. Once the printer driver 206 obtains the response from the OS printing system 203, the process proceeds to S705.

In S705, the printer driver 206 determines whether or not there is an error message (that is, OS-defined error message) notified by the standard error notification function of the OS printing system 203. That is, the printer driver 206 determines whether or not the OS printing system 203 is capable of notifying an error message. If it is determined that the OS-defined error message exists (OS printing system 20 is capable of notifying), the process proceeds to S706, and if it is determined that the error message does not exist (OS printing system 20 is not capable of notifying), the process proceeds to S707.

In S706, the printer driver 206 notifies the OS printing system 203 of the individual error Key determined in S701, and ends the process.

In S707, the printer driver 206 determines a message suitable for the error being generated from the error table 50 managed independently by the vendor. In S708, the printer driver 206 notifies the OS printing system 203 of the generic error Key. In S709, the printer driver 206 stores the original message determined in S707 in the "IPP job-printer-state-message" and notifies it to the OS printing system 203. Then, the process is terminated.

Figure 8:
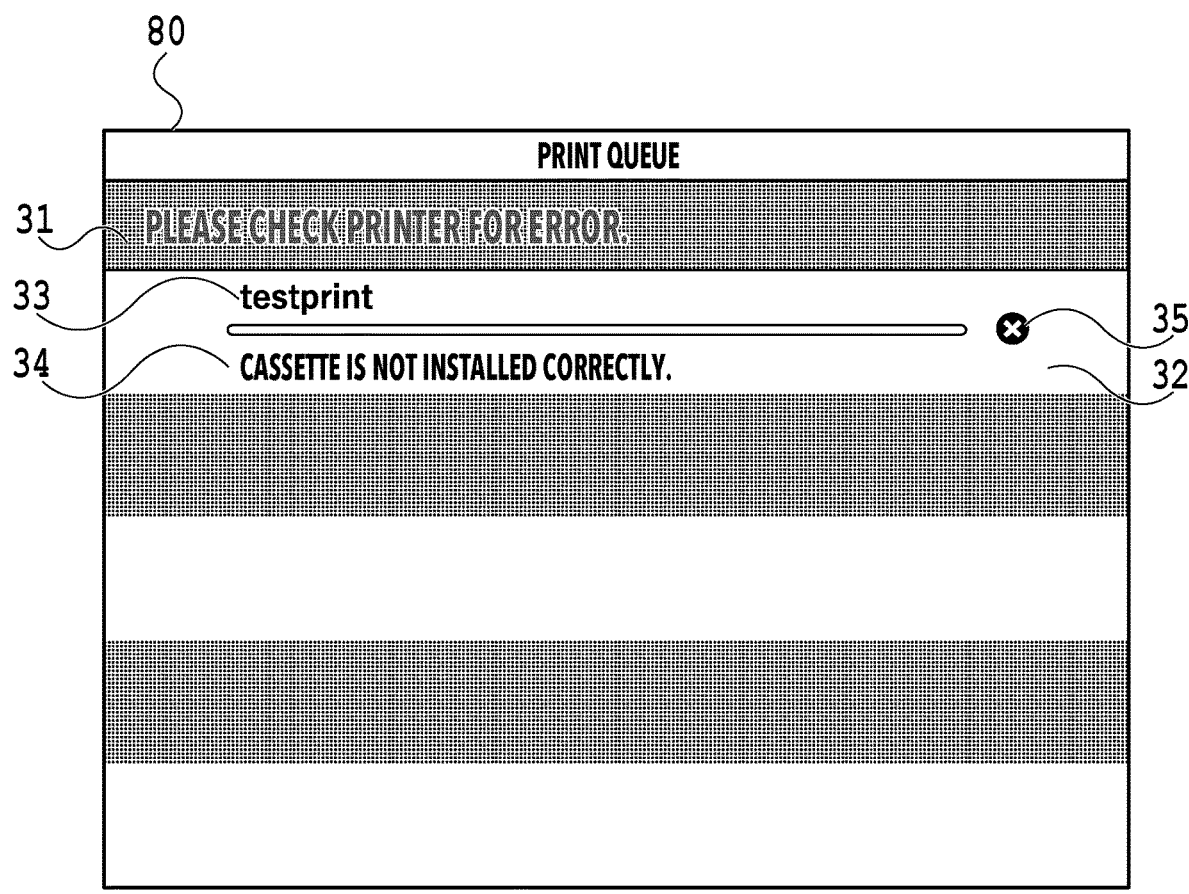
FIG. 8 shows the print queue screen displayed by the OS printing system.

FIG. 8 is a diagram showing an example of a print queue screen 80 displayed by the OS printing system 203 in a case where it is determined in S705 that an error message does not exist. If the OS printing system 203 receives the generic error Key in S708, the OS printing system 203 displays a generic error message in the printer status display area 31. In a case where the OS printing system 203 receives the original message in S709, the OS printing system 203 displays the original message in the print job status display area 34 according to the original message. In the example of FIG. 8, since the determined individual error Key is Other, the printer driver 206 notifies the OS printing system 203 of the generic error Key. Further, the printer driver 206 refers to the error table 50 managed independently by the vendor in FIG. 5 and stores "the cassette is not installed correctly" as an arbitrary error message in the IPP job-printer-state-message. As a result, any error message is displayed in the print job status display area 34 that displays a message indicating the job state.

The example of the print queue screen 30 displayed in a case where it is determined that an error message corresponding to an individual error Key exists in S705, is the print queue screen 30 shown in FIG. 3, as described above.

The flowchart in FIG. 7 shows an example in a case where the printer driver 206 stores its original message in "job-printer-state-message" only if the OS printing system 203 does not support individual errors, but is not limited to this. The printer driver 206 may store its original message in "job-printer-state-message" even if the OS printing system 203 supports individual errors. The process in this case is explained with reference to FIG. 7. If the printer driver 206 notifies the OS printing system 203 of the individual error at S706 in FIG. 7, the process proceeds to S707 and the printer driver 206 determines the message and notifies the OS printing system 203 of the message at S709.

Figure 9A:
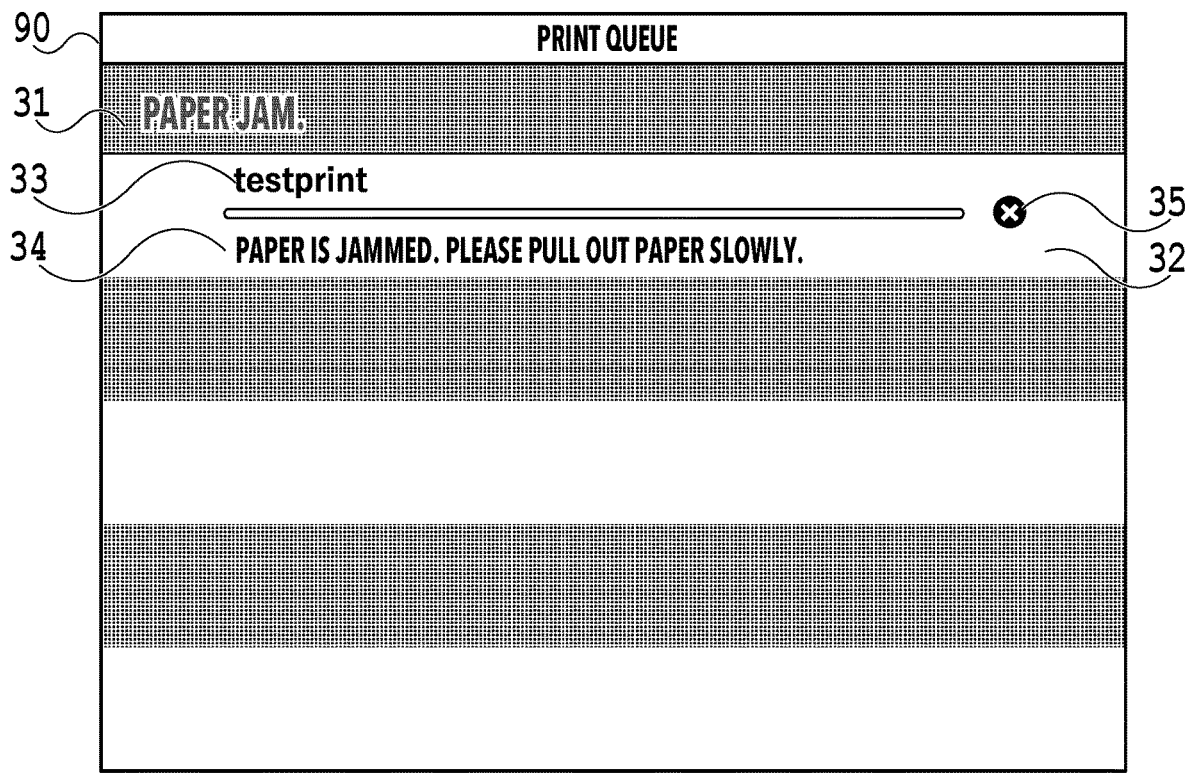
FIGS. 9A and 9B show the print queue screen displayed by the OS printing system, respectively.
Figure 9B:
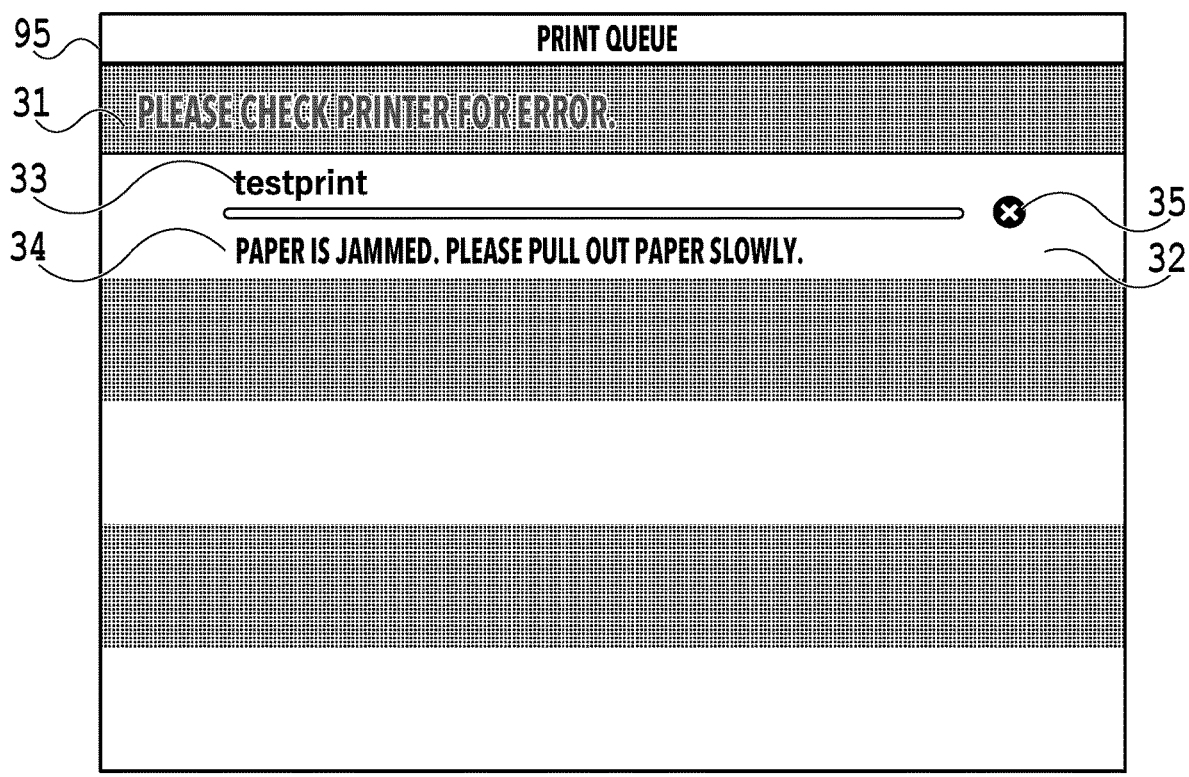

FIGS. 9A and 9B show other examples of the print queue screen. FIG. 9A shows an example where the printer driver 206 stores its original message in "job-printer-state-message", even if the OS printing system 203 supports individual errors. That is, the error message corresponding to the individual error Key is displayed in the printer status display area 31, and the original message is displayed in the print job status display area 34.

Another example is described below. The printer driver 206 may store a generic error Key in "printer-state-reasons" and an original message in "job-printer-state-message" even if the OS printing system 203 supports individual errors. In S701 of FIG. 7, printer driver 206 determines "printer-state-reasons" to be the generic error Key and proceeds to S707 to determine its original message. The printer driver 206 then notifies the OS printing system 203 of the generic error Key at S708 and proceeds to S709 to notify the OS printing system 203 of its original message and terminate the process. FIG. 9B shows an example of the print queue screen 95 in this case. Compared to FIG. 9A, FIG. 9B shows a generic error message in the printer status display area 31. As shown in FIG. 3, FIG. 8, and FIGS. 9A and 9B, various error message display modes can be performed according to the support status of the OS for the individual error Key. Further, as shown in FIGS. 3, 8, and 9A and 9B, the user can grasp the specific content of the error on the print queue screen.

As described above, in the present embodiment, before the printer driver 206 stores the individual error Key in the "printer-state-reasons", it is confirmed whether or not the OS printing system 203 supports the individual error Key. Then, the individual error Key or the generic error Key and the job message are stored in the OS printing system 203 according to the support status of the OS printing system 203. This makes it possible to notify the user of an appropriate error by using the standard error notification function in various versions of the OS.

Second Embodiment

In the first embodiment, a configuration in which the printer driver 206 is compatible with the OS printing system 203 (supports IPP) has been described as an example. Then, an example in which the printer driver 206 notifies the OS printing system 203 of the individual error Key or the generic error Key and the job message according to the support status of the OS printing system 203 for the individual error Key has been described.

However, the printer driver may not be compatible with the OS printing system 203 (it may not support IPP). In the present embodiment, an example of appropriately notifying the OS printing system 203 of an error by using a print utility that extends the OS standard printing function will be described.

Figure 10:
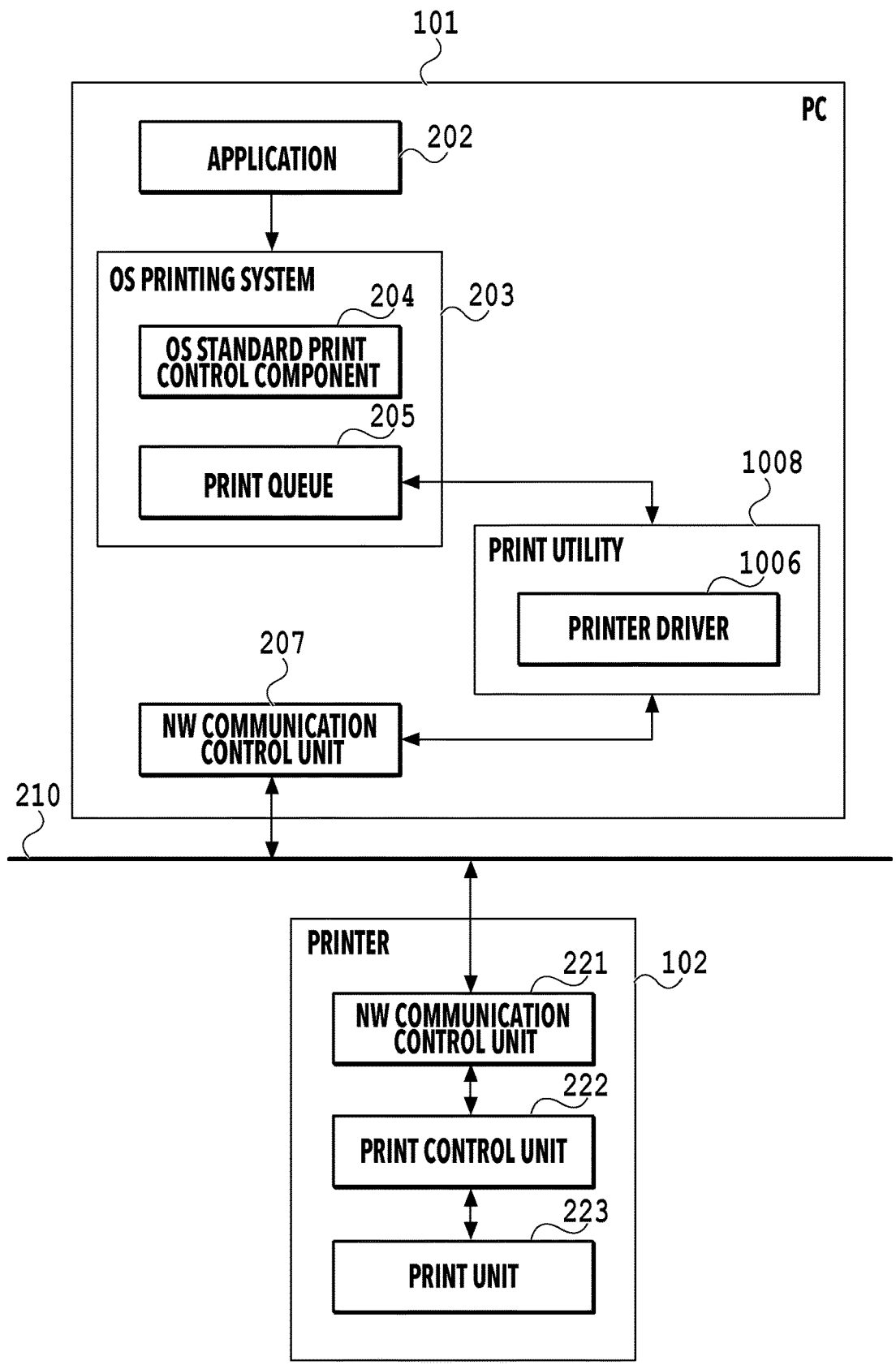
FIG. 10 shows a block diagram of the system.

FIG. 10 is a block diagram showing the overall configuration of the system of the present embodiment. The PC 101 has a print utility 1008. The print utility 1008 has a printer driver 1006. Since the configurations other than the print utility 1008 are the same as those in FIG. 2 described in the first embodiment, the description thereof will be omitted.

The print utility 1008 is software that extends the OS standard printing function, and can be used by the user installing it on the PC 101. The printer driver 1006 does not support the OS printing system 203 (it does not support IPP). The printer driver 1006 exchanges information with the printer 102 according to a vendor-specific protocol. The print utility 1008 that supports IPP converts the information obtained by the printer driver 1006 into IPP and exchanges information with the OS printing system 203. Further, the print utility 1008 converts the information from the OS printing system 203 into a vendor-specific protocol used by the printer driver 1006.

In an environment in which the print utility 1008 is used, the print utility 1008 will perform print data transmission processing and error notification processing. Since the flow of the print data transmission process of the print utility 1008 is the same as that of FIG. 6 of the first embodiment, the description thereof will be omitted.

Figure 11:
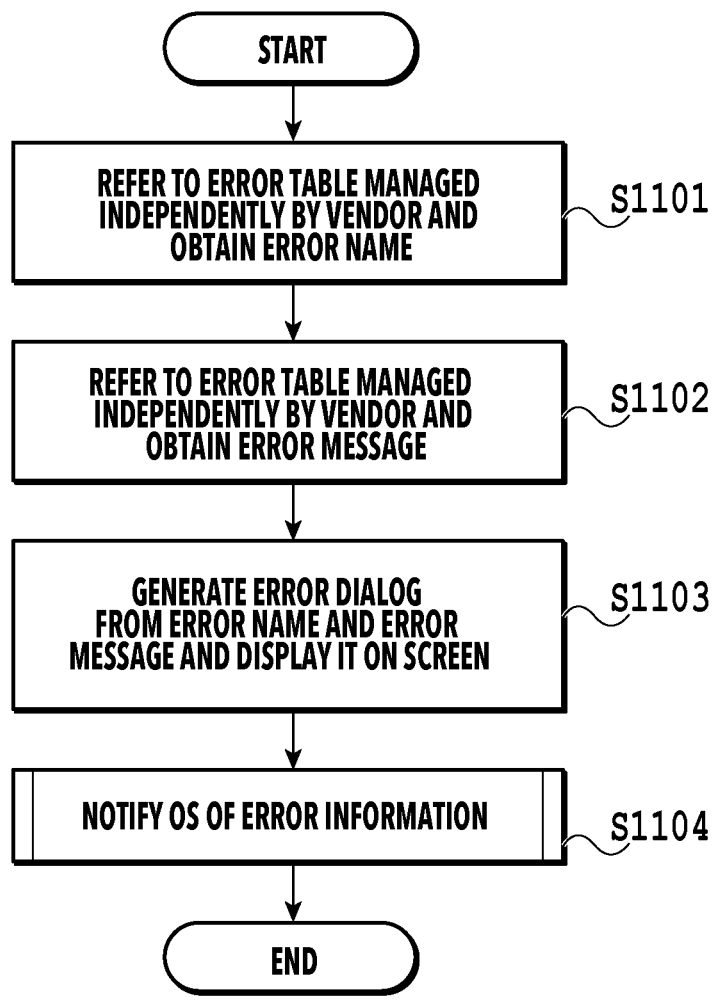
FIG. 11 shows the flow of the print utility's error notification process.

FIG. 11 is a diagram showing a flow of error notification processing of the print utility 1008 in S608 of FIG. 6 in the present embodiment. In the present embodiment, the print utility 1008 displays its original error dialog.

In S1101, the print utility 1008 determines the error number from the status information of the printer 102 analyzed in S606, and obtains the error name by referring to the error table 50 managed independently by the vendor. In S1102, the print utility 1008 obtains an error message by referring to the error table 50 managed independently by the vendor. In S1103, the print utility 1008 configures an error dialog 1200 as shown in FIG. 12 using an error number, an error name, and an error message, and displays the error dialog 1200 on the display 119 of the PC 101.

After that, in S1104, the print utility 1008 notifies the OS printing system 203 of the error information. Since the process of S1104 can have the same flow as that of FIG. 7 of the first embodiment, the description thereof will be omitted. The print utility is provided by the vendor, but since the standard error notification function is installed in the OS, the user can easily notice the error by performing the notification by the standard error notification function too.

Figure 12:
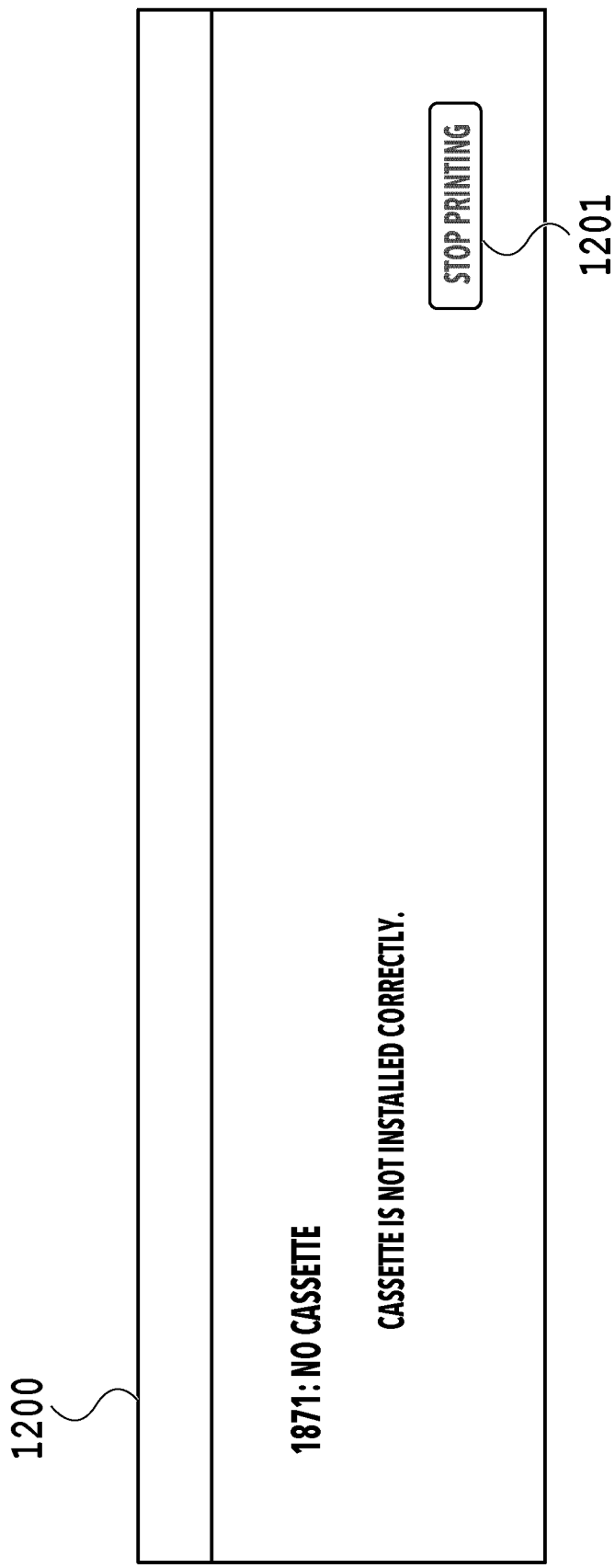
FIG. 12 shows an example of an error screen generated by the print utility.

FIG. 12 is an example of the error dialog 1200 generated and displayed by the print utility 1008 in S1103. This dialog includes an error number, an error name, an error message and a print stop button 1201. If the user presses the print stop button 1201, the print utility 1008 instructs the printer 102 to stop the print process, and can delete the print job.

In the present embodiment, the error information notification process of S1104 may be performed as in the various modifications described in the first embodiment. That is, it is not limited to the example in which the original message is stored in the "job-printer-state-message" in a case where the OS printing system 203 does not support the individual error. As described in the first embodiment, the original message may be stored in the "job-printer-state-message" in a case where the individual error is supported. Further, even in a case where individual errors are supported, a generic error Key may be stored in "printer-state-reasons", and an original message may be stored in "job-printer-state-message".

Further, in FIG. 11, the print utility 1008 generates and displays the error dialog 1200 in S1101 to S1103, and then notifies the OS of the error information in S1104, but the order may be changed. Further, the print utility 1008 does not have to perform the process of generating and displaying the error dialog 1200 in S1101 to S1103.

As described above, in the present embodiment, the print utility that extends the printer driver that does not support IPP confirms whether or not the individual error Key is compatible with the OS printing system. Then, the print utility itself generates and displays an error dialog, and stores an individual error Key or a generic error Key and a job message according to the support status of the OS printing system. This makes it possible to notify the user of an appropriate error by using the standard error notification function in various versions of the OS.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to this disclosure, an appropriate error can be notified to users in various versions of operating systems by using the standard error notification function.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A print control method using print control software configured to communicate with OS printing software operating in an information processing apparatus capable of communicating with a printer, with the print control software operating in the information processing apparatus, the method comprising:
    an identification step of identifying, by the print control software, an error occurring in the printer based on status information obtained from the printer; and
    a control step of performing control such that in a case where the OS printing software is not capable of displaying the error identified in the identification step in a display screen activated by the OS printing software, the print control software notifies the OS printing software of an identifier indicating a generic error such that the generic error is displayed in an area for displaying a state of the printer in the display screen, and
    the print control software notifies the OS printing software of a message corresponding to the identified error such that the message corresponding to the identified error is displayed in an area for displaying a state of a job in the display screen.

2. The print control method according to claim 1, wherein in a case where the OS printing software comprises an error message corresponding to the error identified in the identification step, the print control software determines in the control step that the error is displayable in the display screen activated by the OS printing software.

3. The print control method according to claim 1, wherein the print control software issues a request to the OS printing software for an error message corresponding to the error identified in the identification step and, in a case where no response is made to the request, determines the error is not displayable in the display screen activated by the OS printing software.

4. The print control method according to claim 1, wherein in a case where the error identified in the identification step is displayable in the display screen activated by the OS printing software, the print control software notifies the OS printing software of an identifier indicating a generic error such that the generic error is displayed in an area for displaying a state of the printer, and
    the print control software notifies the OS printing software of a message corresponding to the identified error such that the message corresponding to the identified error is displayed in an area for displaying a state of a job in the display screen.

5. The print control method according to claim 1, wherein in a case where the error identified in the identification step is displayable in the display screen activated by the OS printing software, the print control software notifies the OS printing software of an identifier indicating the identified error such that the identified error is displayed in an area for displaying a state of the printer, and
    the print control software notifies the OS printing software of a message corresponding to the identified error such that the message corresponding to the identified error is displayed in an area for displaying a state of a job in the display screen.

6. The print control method according to claim 1, wherein in a case where the error identified in the identification step is displayable in the display screen activated by the OS printing software, the print control software notifies the OS printing software of an identifier indicating the identified error such that the identified error is displayed in an area for displaying a state of the printer, and the print control software notifies the OS printing software of a message indicating a state of a job in the printer such that the message indicating the state of the job in the printer is displayed in an area for displaying a state of a job in the display screen.

7. The print control method according to claim 1, wherein the control step notifies the OS printing software of the information indicating the state of the printer based on the specifications of the Internet Printing Protocol.

8. The print control method according to claim 1, wherein the control step notifies the OS printing software of the information indicating the state of the job based on the specifications of the Internet Printing Protocol.

9. The print control method according to claim 1, wherein the identification step obtains the status information from the printer without being based on the specifications of the Internet Printing Protocol.

10. An information processing apparatus using print control software configured to communicate with OS printing software operating in the information processing apparatus and capable of communicating with a printer, the information processing apparatus comprising:

a controller including a memory storing instructions and a processor executing the instructions, with the instructions being executed to:

identify, by the print control software, an error occurring in the printer based on status information obtained from the printer; and perform control such that, in a case where the OS printing software is not capable of displaying the identified error in a display screen activated by the OS printing software, the print control software notifies the OS printing software of an identifier indicating a generic error such that the generic error is displayed in an area for displaying a state of the printer in the display screen, and the print control software notifies the OS printing software of a message corresponding to the identified error such that the message corresponding to the identified error is displayed in an area for displaying a state of a job in the display screen.

11. A non-transitory computer readable storage medium storing a program of print control software operable in an information processing apparatus using print control software configured to communicate with OS printing software operating in the information processing apparatus and capable of communicating with a printer, the program causing a computer to execute:

an identification step of identifying, by the print control software, an error occurring in the printer based on status information obtained from the printer; and a control step of performing control such that, in a case where the OS printing software is not capable of displaying the error identified in the identification step in a display screen activated by the OS printing software, the print control software notifies the OS printing software of an identifier indicating a generic error such that the generic error is displayed in an area for displaying a state of the printer in the display screen, and the print control software notifies the OS printing software of a message corresponding to the identified error such that the message corresponding to the identified error is displayed in an area for displaying a state of a job in the display screen.

* * * * *